(12) United States Patent
Backhouse (10) Patent No.: US 7,509,335 B2
(45) Date of Patent: *Mar. 24, 2009

(54) SYSTEM AND METHOD FOR EXTENSIBLE JAVA SERVER PAGE RESOURCE MANAGEMENT

(75) Inventor: Richard Andrew Backhouse, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/832,034

(22) Filed: Aug. 1, 2007

(65) Prior Publication Data

US 2007/0271550 A1    Nov. 22, 2007

Related U.S. Application Data

(63) Continuation of application No. 10/954,089, filed on Sep. 29, 2004, now Pat. No. 7,376,660.

(51) Int. Cl.
*G06F 7/00* (2006.01)
*G06F 17/00* (2006.01)
*G06F 12/00* (2006.01)
*G06F 17/30* (2006.01)

(52) U.S. Cl. .................. 707/101; 717/115; 707/102; 707/200; 707/203

(58) Field of Classification Search ............... 707/101; 717/115

See application file for complete search history.

(56) References Cited

U.S. PATENT DOCUMENTS

| | | | |
|---|---|---|---|
| 5,261,080 A | 11/1993 | Khoyi et al. | |
| 5,369,778 A | 11/1994 | San Soucie et al. | |
| 5,421,012 A | 5/1995 | Khoyi et al. | |
| 5,421,015 A | 5/1995 | Khoyi et al. | |
| 5,634,124 A | 5/1997 | Khoyi et al. | |
| 6,252,591 B1 | 6/2001 | Dockweiler et al. | |
| 2002/0184401 A1 | 12/2002 | Kadel, Jr. et al. | |
| 2003/0226107 A1 | 12/2003 | Pelegri-Llopart et al. | |
| 2006/0075385 A1* | 4/2006 | Backhouse .................. 717/115 |

FOREIGN PATENT DOCUMENTS

WO    9837486    8/1998

OTHER PUBLICATIONS

"Efficient and dynamically Extensible Classpath management for Java Application Serveers", IBM Research Disclosure 440169, Dec. 2000, p. 2221.

* cited by examiner

*Primary Examiner*—John E Breene
*Assistant Examiner*—Joshua Bullock
(74) *Attorney, Agent, or Firm*—Yee & Associates, P.C.; Bruce Clay (57) ABSTRACT

A system and method of providing resource management in association with extensible Java Server Pages are provided. The system and method provide an interface for defining alternative input source, resource path and compilers for generating JSP servlets for processing JSP requests. A JSP provider may define an extensible translation context that identifies whether default translation operations or extensible translation operations are to be performed. With regard to extensible translation operations, the provider may establish one or more of an extensible input source factory, an extensible resource factory and an extensible compiler factory. These factories provide a mechanism through which input source objects, resource objects, and compiler objects for alternative translation and compilation of the JSP servlet.

3 Claims, 7 Drawing Sheets

SYSTEM AND METHOD FOR EXTENSIBLE JAVA SERVER PAGE RESOURCE MANAGEMENT

This application is a continuation of application Ser. No. 10/954,089, filed Sep. 29, 2004 now U.S. Pat. No. 7,376,660, status pending.

BACKGROUND OF THE INVENTION

1. Technical Field

The present invention is generally directed to an improved data processing system. More specifically, the present invention is directed to a system and method of providing resource management in association with extensible Java Server Pages.

2. Description of Related Art

Java Server Pages (JSPs) are an extension to the Java servlet technology from Sun Microsystems that allows HyperText Markup Language (HTML) code to be combined with Java code on the same page. The Java provides the processing and the HTML provides the page layout that will be rendered in the Web browser.

JSPs are the primary method in the Java 2 Enterprise Edition (J2EE) platform for displaying dynamic Web pages. Special tags allow Java code to be included on the page as well as inserted into HTML statements without invalidating the HTML syntax. Thus, JSPs let non-Java programmers maintain HTML pages in their favorite authoring programs without interfering with the Java code on the page. With the use of standard and custom JSP tags, the Java code can be completely hidden.

At runtime, the application server turns the JSP into a Java servlet (e.g., .jsp file to .java file) using a JSP translator, which is a part of the servlet container. The servlet is then compiled into bytecode (.class) and run on the server like any other servlet.

Just as a web server needs a servlet container to provide an interface to servlets, the server needs a JSP container to process JSP pages. The JSP container is responsible for intercepting requests for JSP pages and processes these requests in order to provide the JSP pages to the requester.

To process all JSP elements, e.g., directive elements, action elements, and scripting elements, in the JSP page, the container first turns the JSP page into a servlet (known as the JSP page implementation class). The conversion involves converting all template text to println( ) statements and all JSP elements are converted to Java code that implements the corresponding dynamic behavior. The container then compiles the servlet class.

Converting the JSP page to a servlet and compiling the servlet form the translation phase. The JSP container initiates the translation phase for a page automatically when it receives the first request for the page. The JSP container is also responsible for invoking the JSP page implementation class (the generated servlet) to process each request and generate the response. This is called the request processing phase.

Figure 1:
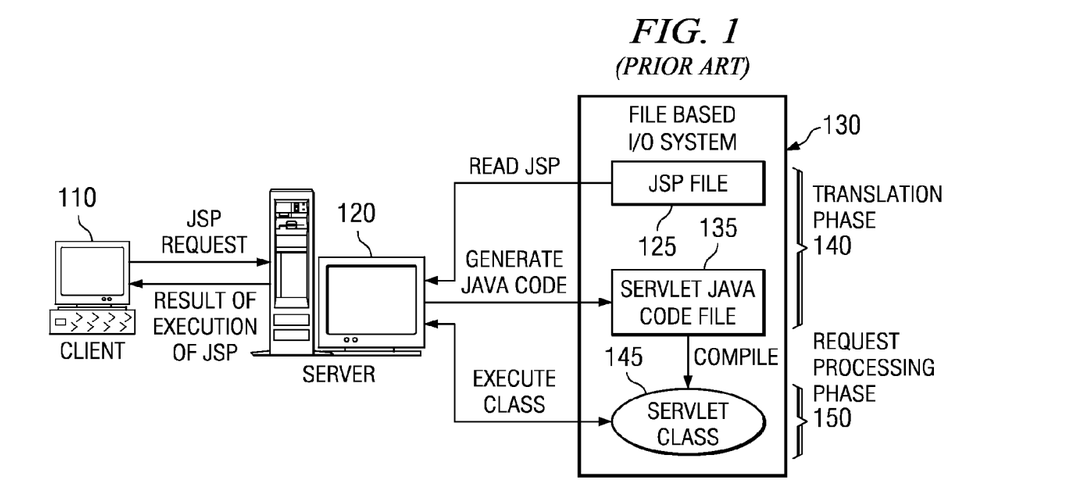
FIG. 1 illustrates an example of the phases of execution with regard to processing a request for a JSP from a client computing device.

FIG. 1 illustrates an example of the phases of execution with regard to processing a request for a JSP from a client computing device. As shown in FIG. 1, a client computing device 110 may send a request for a JSP to a server 120 that includes a JSP container. The server 120 reads the JSP file 125 from a file based I/O system 130 and generates servlet Java code 135 from the JSP file 125. The reading in of the JSP file 125 and the generation of the servlet Java code 135 from the JSP file 125 constitute a translation phase 140 of the processing of the JSP.

Thereafter, the generated servlet Java code 135 is compiled into a servlet class 145 in a request processing phase 150. The server 120 with the JSP container may then execute the servlet class 145 to return the requested JSP content to the client computing device 110.

As long as the JSP page remains unchanged, any subsequent request goes straight to the request processing phase 150, i.e. the JSP container on server 120 simply executes the servlet class file 145. When the JSP page is modified, it goes through the translation phase 140 again before entering the request processing phase 150.

The JSP container is often implemented as a servlet configured to handle all requests for JSP pages. In fact, these two containers, a servlet container and a JSP container, are often combined in one package under the name web container.

Typical JSP containers provide a rigid implementation for the management of Java Server Page resources. Input resources, such as JSP pages, JSP documents, tagfiles and tag library descriptors (TLDs) are expected to be read from file based input/output (I/O) systems. Generated resources, such as the generated source code 135 for the JSP servlet are also expected to be read from/written to file based I/O systems. However, it is sometimes desirable to access resources from other sources other than file based I/O systems.

For example, in WebSphere™, available from International Business Machines, Inc., some JSPs have been required to be able to provide, input sources of JSPs from other sorts of I/O systems, such as relational databases. Typically, in order to provide the ability for a JSP to obtain input from other types of I/O systems, the JSP container code must be manually modified directly. Thus, it would be beneficial to have a system and method for extensible JSP resource management such that the JSP may obtain input from various types of I/O systems without requiring direct JSP container code modification.

BRIEF SUMMARY OF THE INVENTION

The present invention provides a system and method of providing resource management in association with extensible Java Server Pages. The system and method of the present invention provide an interface for defining alternative input source, resource path and compilers for generating JSP servlets for processing JSP requests. With the mechanisms of the present invention, a JSP provider may define an extensible translation context that identifies whether default translation operations or extensible translation operations are to be performed. With regard to extensible translation operations, the provider may establish one or more of an extensible input source factory, an extensible resource factory and an extensible compiler factory. These factories provide a mechanism through which input source objects, resource objects, and compiler objects for alternative translation and compilation of the JSP servlet. These and other features and advantages of the present invention will be described in, or will become apparent to those of ordinary skill in the art in view of, the following detailed description of the preferred embodiments.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

The present invention provides a mechanism for resource management in association with Java Server Pages (JSPs) such that input for processing and executing the JSPs may be obtained from a variety of different sources rather than being limited to file based input/output (I/O) systems. Since the present invention is directed to operation with JSPs, the present invention is especially well suited for implementation in a distributed data processing system, such as a local area network (LAN), wide area network (WAN), the Internet, or the like. However, the present invention may also be implemented in a stand-alone data processing system, such as a personal computing system, without departing from the spirit and scope of the present invention.

Figure 2:
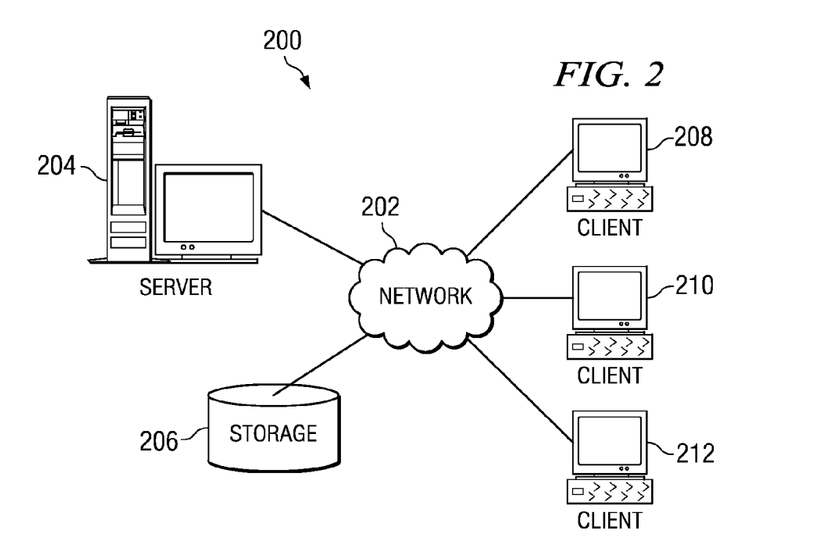
FIG. 2 is an exemplary diagram illustrating a distributed data processing system environment in which aspects of the present invention may be implemented.
Figure 3:
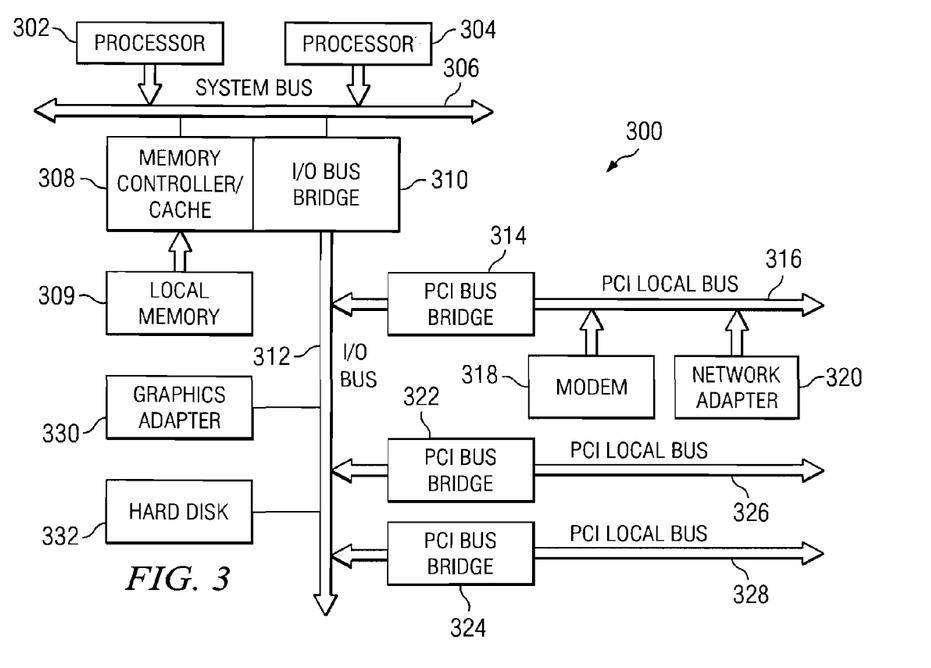
FIG. 3 is an exemplary block diagram illustrating a server computing device in which aspects of the present invention may be implemented.
Figure 4:
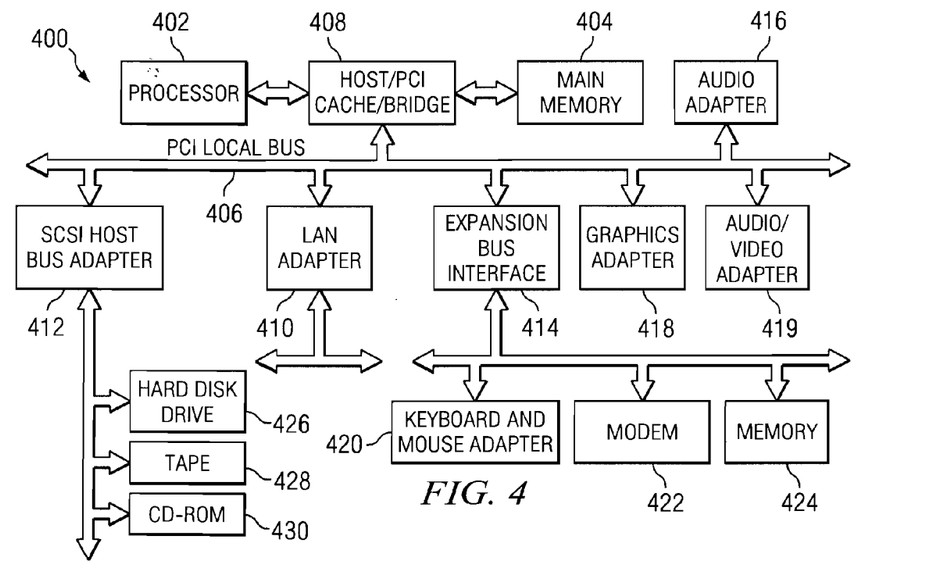
FIG. 4 is an exemplary block diagram illustrating a client computing device in which aspects of the present invention may be implemented.

As such, the following FIGS. 2-4 are provided as exemplary environments in which aspects of the present invention may be implemented. FIGS. 2-4 are not intended to state or imply any limitation as to the data processing environments in which the present invention may be implemented but are only provided as examples. Many modifications may be made to the data processing environments and computing devices depicted in FIGS. 2-4 without departing from the spirit and scope of the present invention.

With reference now to the figures, FIG. 2 depicts a pictorial representation of a network of data processing systems in which the present invention may be implemented. Network data processing system 200 is a network of computers in which the present invention may be implemented. Network data processing system 200 contains a network 202, which is the medium used to provide communications links between various devices and computers connected together within network data processing system 200. Network 202 may include connections, such as wire, wireless communication links, or fiber optic cables.

In the depicted example, server 204 is connected to network 202 along with storage unit 206. In addition, clients 208, 210, and 212 are connected to network 202. These clients 208, 210, and 212 may be, for example, personal computers or network computers. In the depicted example, server 204 provides data, such as boot files, operating system images, and applications to clients 208-212. Clients 208, 210, and 212 are clients to server 204. Network data processing system 200 may include additional servers, clients, and other devices not shown. In the depicted example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 200 also may be implemented as a number of different types of networks, such as for example, an intranet, a local area network (LAN), or a wide area network (WAN). FIG. 2 is intended as an example, and not as an architectural limitation for the present invention.

Referring to FIG. 3, a block diagram of a data processing system that may be implemented as a server, such as server 204 in FIG. 2, is depicted in accordance with a preferred embodiment of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O Bus Bridge 310 is connected to system bus 306 and provides an interface to I/O bus 312. Memory controller/cache 308 and I/O Bus Bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to clients 208-212 in FIG. 2 may be provided through modem 318 and network adapter 320 connected to PCI local bus 316 through add-in connectors.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM eServer pSeries system, a product of International Business Machines Corporation in Armonk, N.Y., running the Advanced Interactive Executive (AIX) operating system or LINUX operating system.

With reference now to FIG. 4, a block diagram illustrating a data processing system is depicted in which the present invention may be implemented. Data processing system 400 is an example of a client computer or stand-alone computer. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI Bridge 408. PCI Bridge 408 also may include an integrated memory controller and cache memory for processor 402. Additional connections to PCI local bus 406 may be made through direct component interconnection or through add-in boards. In the depicted example, local area network (LAN) adapter 410, small computer system interface (SCSI) host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as Windows XP, which is available from Microsoft Corporation. An object oriented programming system such as Java may run in conjunction with the operating system and provide calls to the operating system from Java programs or applications executing on data processing system 400. "Java" is a trademark of Sun Microsystems, Inc. Instructions for the operating system, the object-oriented programming system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash read-only memory (ROM), equivalent nonvolatile memory, or optical disk drives and the like, may be used in addition to or in place of the hardware depicted in FIG. 4. Also, the processes of the present invention may be applied to a multiprocessor data processing system.

As another example, data processing system 400 may be a stand-alone system configured to be bootable without relying on some type of network communication interfaces. As a further example, data processing system 400 may be a personal digital assistant (PDA) device, which is configured with ROM and/or flash ROM in order to provide non-volatile memory for storing operating system files and/or user-generated data.

The depicted example in FIG. 4 and above-described examples are not meant to imply architectural limitations. For example, data processing system 400 also may be a notebook computer or hand held computer in addition to taking the form of a PDA. Data processing system 400 also may be a kiosk or a Web appliance.

As mentioned above, the present invention provides a mechanism for resource management of resources associated with JSPs. The mechanisms of the present invention provide the ability for resources for implementing and executing JSPs to be provided from sources other than file based I/O systems, in addition to or in replacement of file based I/O systems. The present invention provides these mechanisms through a new system programming interface (SPI) referred to herein as the Extensible Java Server Pages (JSP) Resource Management SPI. This Extensible JSP Resource Management SPI allows third party vendors and tools developers to provide their own implementation of classes that create and load JSP resources.

The Extensible JSP Resource Management SPI is comprised of four main sections including a JSP Context Management component, the JSP Input Source Management component, a Created JSP Resource Management component, and a Java Compiler Management component. The JSP Context Management component provides access to default SPI implementations and other environment specific information, such as real file paths and the like. The JSP Input Source Management component manages input sources, such as JSP files, tagfiles and tag library descriptors. The Created JSP Resource Management component manages generated JSP servlet source and class files, generated tagfile source and class files, etc. The Java Compiler Management component provides an interface into standard and alternative javac compilers such as jikes. The functionality of these components will be described in greater detail hereafter with reference to FIGS. 5-9. By providing the functionality of these various components in the SPI, tools and third party vendors may extend or override the default behavior of a JSP container without having to modify the implementation directly.

Figure 5:
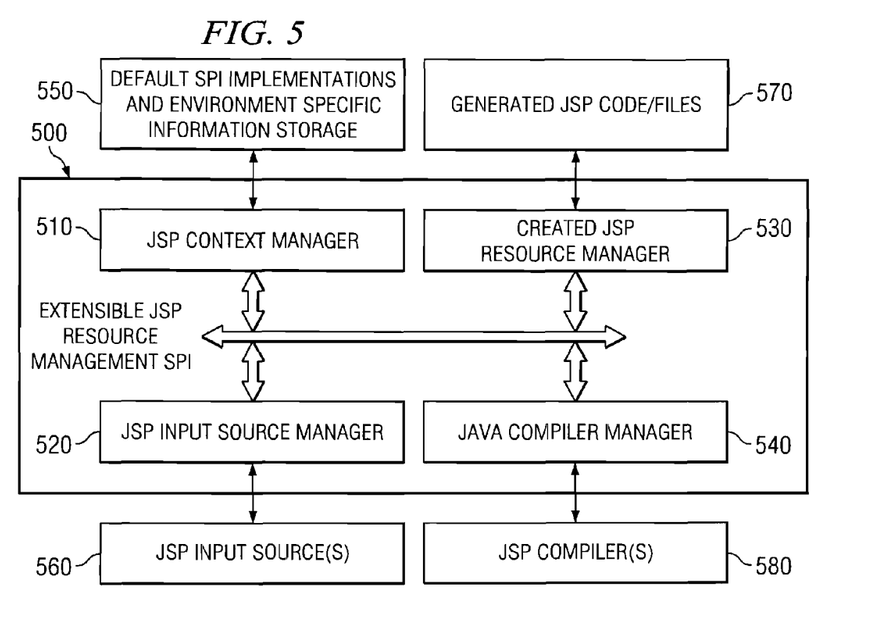
FIG. 5 is an exemplary diagram illustrating the primary operational components of a Java Server Pages Resource Management System Programming Interface in accordance with one exemplary embodiment of the present invention.

FIG. 5 is an exemplary diagram illustrating the primary operational components of a Java Server Pages Resource Management System Programming Interface in accordance with one exemplary embodiment of the present invention. As shown in FIG. 5, the extensible JSP Resource Management SPI 500 includes a JSP translation context manager 510, a JSP input source manager 520, a created JSP resource manager 530 and a Java compiler manager 540.

The JSP translation context manager 510 provides an interface to the default SPI implementations and environment specific information storage 550. The JSP translation context manager 510 is used by the JSP engine of a server to determine whether a particular web application's JSP has a specific translation context object established for that JSP so that specialized JSP translation may be performed or whether a default translation context object and default JSP translation processing is to be performed. Since, through the mechanisms of the present invention, a provider of a web application may be designate a JSP translation context object for a JSP when the web application is created, this specialized JSP translation context object may designate a different input source factory, resource factory, and compiler factory for a JSP than is provided by the JSP engine, i.e. the default factories. As a result, through these specialized or "extensible" factories, the provider of the web application may designate different input sources, different translation mechanisms, and different compilers than are generally used by the standard JSP engine.

The JSP input source manager 520 provides an interface to JSP input source(s) 560. Through the use of an extensible input source factory object associated with a JSP, the JSP input source manager 520 may obtain input source data, such as a JSP file, from various sources, e.g., file based I/O systems, non-file based I/O systems such as databases, and the like. In this way, a provider of a web application may provide an extensible input source factory object in association with a JSP with the particular input sources to be used in generating a JSP servlet class being designated in the extensible input source factory object associated with the JSP.

The created JSP resource manager 530 provides an interface to generated JSP code/files 570. Through the use of an extensible resource factory object associated with the JSP, the created JSP resource manager 530 may determine if a JSP is outdated, and if so, may translate the JSP input source data into a JSP servlet source file. In this way, a provider of a web application may provide an extensible resource factory object in association with a JSP that provides alternative mechanisms for determining if the JSP is outdated and for translating the JSP input source data as opposed to the default mechanisms provided in known JSP engines.

The Java compiler manager 540 provides an interface to JSP compiler(s) 580. Through the use of an extensible compiler factory object associated with a JSP, a provider of a web application may designate an alternative type of compiler to be used in compiling the JSP servlet source file into a JSP servlet class and then process a JSP request. The Java compiler manager 540 may be used to perform this compilation of the JSP source file based on the information provided in the extensible compiler factory object associated with the JSP.

In operation, when a web application is created, a developer of the web application may make use of the extensible JSP resource management SPI of the present invention by defining an extensible translation context object for the web application which is used for all JSP processing within that web application. The extensible translation context object may define one or more of an extensible input source factory object, an extensible resources factory object, and an extensible compiler factory object. The web application and these associated extensible objects may be maintained by a server or other computing device so as to provide requested functionality to a user, such as a user of a client computing device.

When a request is received that requires the execution of a JSP that has been extended by the use of the extensible JSP resource management SPI of the present invention, the request is received by the extensible JSP resource management SPI in the server and each of the components 510-540 operate on the request, i.e. the JSP request, to determine how to instantiate a JSP servlet object to handle the request.

In order to instantiate the JSP servlet object, the JSP translation context manager 510 first looks for an extensible translation context object associated with a JSP of the web application to which the request is directed. If an extensible translation context object does not exist, a default translation context object is utilized and a default JSP translation operation is performed similar to that illustrated in FIG. 1 above.

If an extensible translation context object does exist for the JSP, then an attempt is made to obtain the JSP input source factory object referenced by the extensible translation context object, if any. The first operation of determining whether there is an extensible translation context object defined for a JSP is intended to be a determination between whether traditional JSP translation operations and execution of the JSP servlet are to be performed or if specialized translation and processing of the JSP servlet is needed based on extensible objects being defined for the JSP.

If there is not an extensible input source factory object provided, a default input source factory object is obtained and the JSP input source is identified using this default input source factory object. For example, a default input source object may be one that identifies a JSP file in a file based I/O system, similar to that described in FIG. 1 above. If an extensible source factory object is provided, the JSP input source is obtained from the extensible input source factory. In this way, the extensible source factory object may be used by a developer of a web application, or other third party vendor, to designate a different input source for the JSP than is traditionally required by the JSP engine, i.e. the file based I/O system. Thus, through use of the extensible source factory object, a developer may designate a database, an XML document repository, or other input source for the input source data for generating the JSP servlet.

Once the JSP input source is obtained from either the default or the extensible JSP input source object, the translation process for translating the input source data into a servlet Java code file is started. As part of this operation, a determination is made as to whether an extensible resources factory object has been defined for the JSP. If not, a default resources factory object is obtained and the resource object is obtained from the default resources factory object. If an extensible resources factory object is defined for the JSP, then the factory object is obtained from the extensible resources factory object.

The resources factory object provides a mechanism for defining how to generate the servlet Java code file for the JSP servlet. In addition, the resources factory object may identify the criteria by which a determination may be made as to whether the JSP resources are outdated. In a traditional JSP engine, timestamps are used to determine if a JSP resource is outdated and thus, a translation of the JSP input source is needed with a new JSP servlet source file being generated. However, through the use of the extensible resources factory object of the present invention, alternative mechanisms for determining whether a JSP resource is outdated may be defined. For example, rather than using a timestamp, other criteria, such as a column in a database table that indicates whether a JSP has been modified, or the like, may be used as defined by the extensible resources factory object.

Based on the criteria set by the extensible resources factory object, or alternatively by the default resources factory object, i.e. timestamp, a determination may be made as to whether translating of the input source data and generation of a new JSP servlet source file is necessary. If not, then the existing JSP servlet object may be used to process the JSP request. If translation and generation of a new JSP servlet source file is necessary, then the translation and generation may be initiated using the resources factory object.

As part of the generation of the JSP servlet object a determination may be made as to whether an extensible compiler factory object is defined for the JSP. If not, the default compiler factory object is used to compile the JSP servlet source file into a JSP servlet object. If an extensible compiler factory object is defined, the compiler referenced by the extensible compiler factory object is obtained and used to compile the JSP servlet source file into a JSP servlet object. In this way, through the use of the extensible compiler factory object, a developer or provider of the web application or JSP may define an alternative compiler for the JSP servlet source file than that typically used by a traditional JSP engine. Thereafter, the generated JSP servlet object is used to process the JSP request and provide output to the originator of the JSP request.

Figure 6:
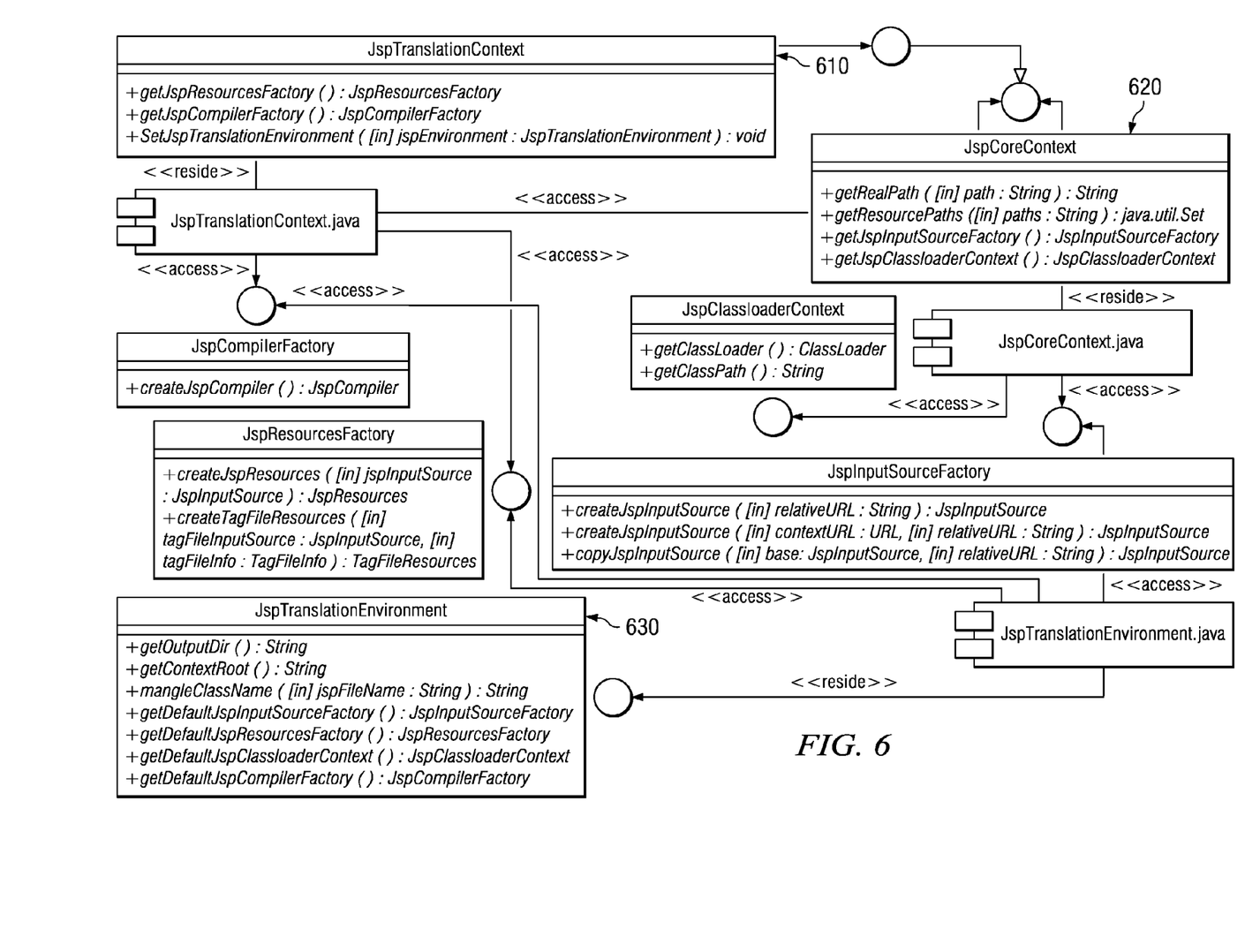
FIG. 6 is an exemplary diagram illustrating an exemplary architecture of an extensible translation context interface of a JSP Resource Management SPI in accordance with one exemplary embodiment of the present invention.

FIG. 6 is an exemplary diagram illustrating an exemplary architecture of an extensible translation context interface of a JSP Resource Management SPI in accordance with one exemplary embodiment of the present invention. As shown in FIG. 6, the extensible translation context includes JspTranslationContext class 610, JspCoreContext class 620 and JspTranslationEnvironment class 630. The JSPTranslationContext class 610 is the entry point to all of the resource management functionality of the JSP resource management SPI. Through this interface, access to all the subsections of support are available.

The JspTranslationContext class 610 includes methods for obtaining the JspREsourcesFactory for a JSP, the JspCompilerFactory for the JSP, and for setting the JspTranslationEnvironment object associated with the JSP. The JspTranslationEnvironment object provides access to all the default SPI implementations of the JspInputSourceFactory, JspResourcesFactory, JspClassloaderContext, and JspCompilerFactory. In this way, a developer of the web application of JSP need not replace or extend all of the resource management functionality provided in the traditional or default JSP engine with extensible functionality.

The JspCoreContext class 620 includes methods for obtaining the real path, the resources paths, the JspInputSourceFactory, and the JspClassloaderContext. Through these methods, the JspCoreContext accesses the JspClassloaderContext and the JspInputSourceFactory to access the input source data for the JSP. Both the JspTranslationContext class 610 and the JspTranslationEnvironment class 630 access the JspCompilerFactory and JspResourcesFactory class objects to create the necessary JSP resources, e.g., JSP servlet source file, and JSP compiler for translating and generating the JSP servlet object.

Figure 7:
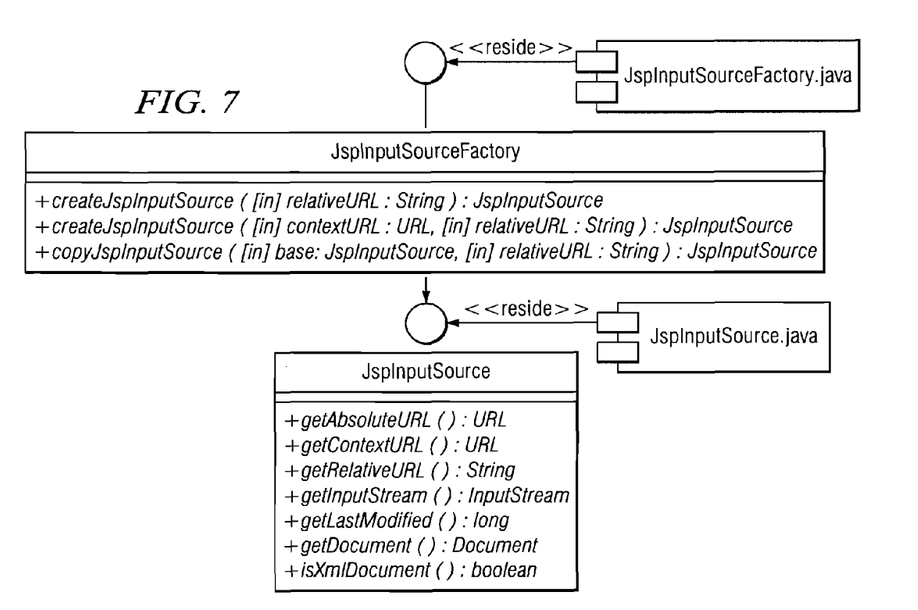
FIG. 7 is an exemplary diagram illustrating an exemplary architecture of a JSP input source factory interface in accordance with one exemplary embodiment of the present invention.

FIG. 7 is an exemplary diagram illustrating an exemplary architecture of a JSP input source factory interface in accordance with one exemplary embodiment of the present invention. The JSP input source factory interface is used to create JspInputSource objects. Two createJspInputSource methods are utilized—one to create input source objects based on a default context uniform resource locator (URL) for the web application and one to create input source objects from a supplied context URL. The second createJspInputSource method is used to create input sources from resources such as Java Archive (JAR) files.

A copyJspInputSource method is utilized to obtain resources, such as static "includes," that share the same context URL of a parent input source object. JSP's provide a mechanism for including content from other files. This is very similar to how "includes" work in other languages. The included content is injected into the JSP source and it is then treated as one input source. The existing rules for where the included resource resides in relation to the including JSP dictate that they must share the same context. The copyJspInputSource method allows the included input to be processed without providing the context information again.

A JspLnputSource object provides information on how to retrieve the source for a JSP page. It is identified via a context URL object and a relative URL string. Through the use of the present invention, the source of the JSP page can also be provided from an extensible markup language (XML) document object directly, thus bypassing the standard JSP parsing logic. The absolute URL object returned from the JsplnputSource object is used to obtain an input stream to the JSP source. The getLastModified method can be used by the JSP resources object to determine if a JSP page needs to be translated due to its having been updated.

Figure 8:
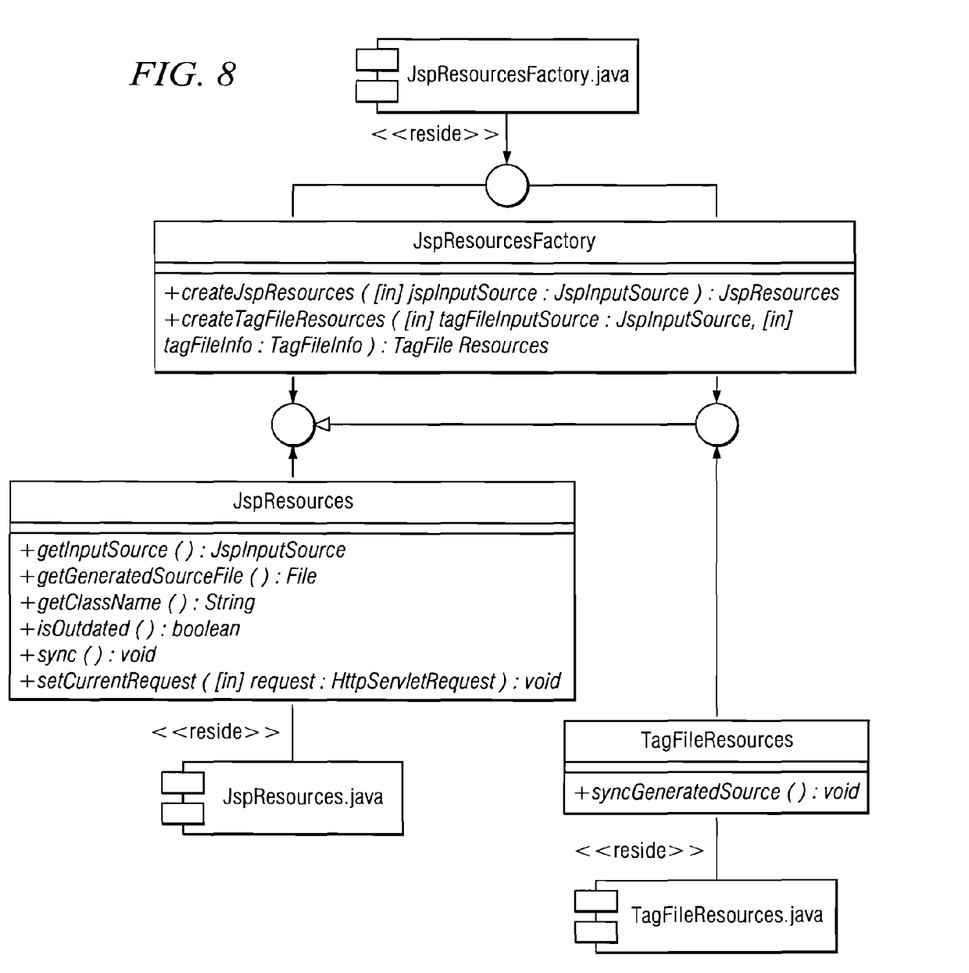
FIG. 8 is an exemplary diagram illustrating an exemplary architecture of a JSP Resources Factory interface in accordance with one exemplary embodiment of the present invention.

FIG. 8 is an exemplary diagram illustrating an exemplary architecture of a JSP Resources Factory interface in accordance with one exemplary embodiment of the present invention. The JsPResources and TagFileResources objects represent all the resources required to translate and compile JSP pages and tagfiles. This includes the JspInputSource object that provided the JSP/tagfile source along with the generated JSP servlet/custom tag source file object. These objects are used to determine whether or not a translation is required. If a translation occurs, a sync method is called to allow the JspResources object to set any timestamp information for the newly translated and generated resources.

Figure 9:
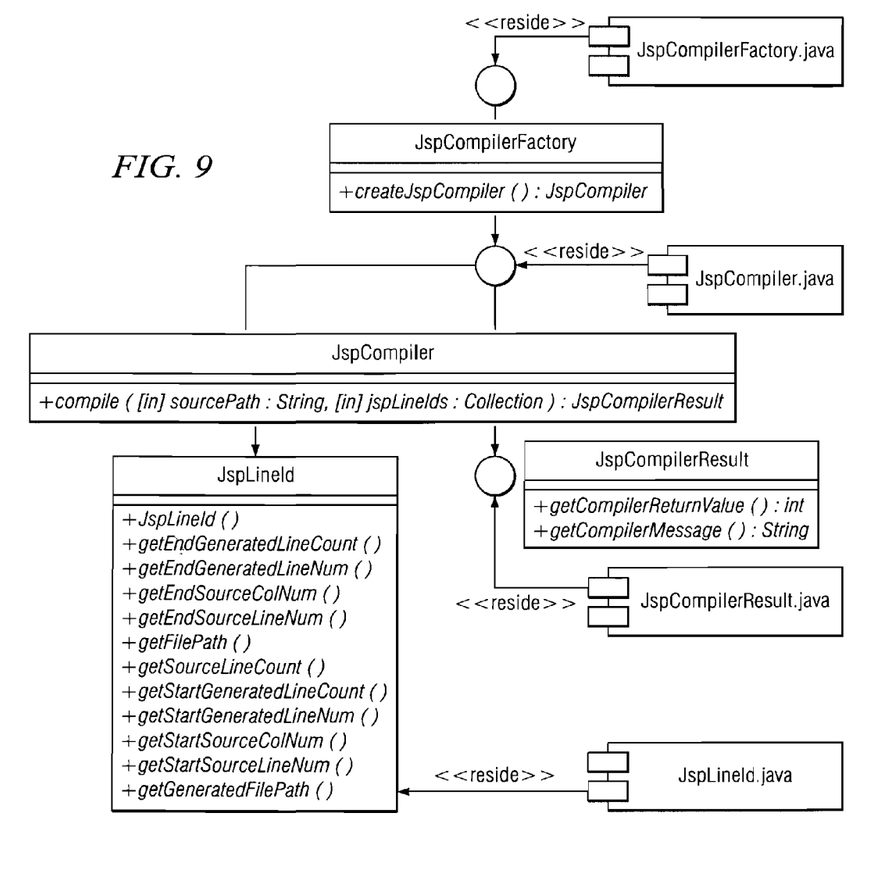
FIG. 9 is an exemplary diagram illustrating an exemplary architecture of a JSP compiler factory interface in accordance with one exemplary embodiment of the present invention.

FIG. 9 is an exemplary diagram illustrating an exemplary architecture of a JSP compiler factory interface in accordance with one exemplary embodiment of the present invention. The JspCompilerFactory interface allows for an alternative Java compiler to be provided for use when compiling the generated JSP servlet. The JspCompilerFactory interface is used to create instances of classes implementing the JspCompiler interface. The JspCompiler object is used to actually compile the generated JSP servlet. The compile method is given a collection of JspLineid objects that represent the mappings of line number information between the generated Java source and the JSP source. This information can be used by the JspCompiler object to create more meaningful error messages when compile errors occur. The compile method also returns a JspCompileResult object that provides details of the compile, e.g., whether it was successful and any error messages.

Through the use of these interfaces, the JSP engine may identify extensible factory interfaces defined for use with generating a JSP servlet to process a JSP request. These extensible factory interfaces permit different input sources, different generated resource paths, different out-of-date criteria, and different compilers to be identified, as compared to traditional JSP engines, and used to generate the JSP servlet. In this way, web application developers or other third party vendors may specify alternatives to the standard JSP engine requirements for generating a JSP servlet.

Figure 10:
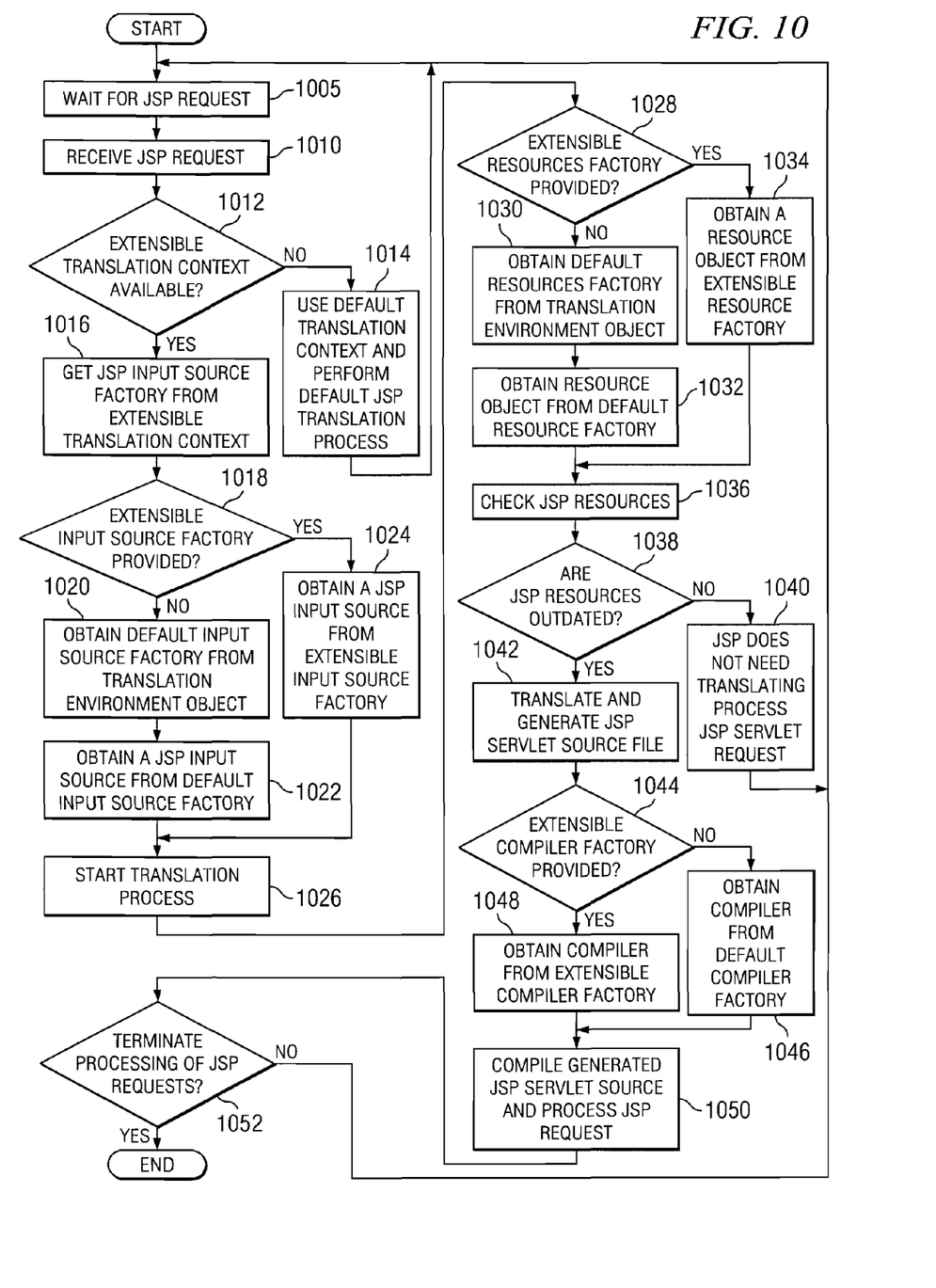
FIG. 10 is a flowchart outlining an exemplary operation of one exemplary embodiment of the present invention when processing a JSP request.

FIG. 10 is a flowchart outlining an exemplary operation of one exemplary embodiment of the present invention when processing a JSP request. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 10, the operation waits for a JSP request (step 1005). When a JSP request is received (step 1010), a determination is made as to whether an extensible translation context is available for the JSP to which the JSP request is directed (step 1012). If an extensible translation context is not available for the JSP, a default translation context is utilized and a default JSP translation operation is performed (step 1014).

If an extensible translation context does exist for the JSP, then the JSP input source factory is obtained from the extensible translation context (step 1016). A determination is made as to whether the JSP input source factory is an extensible input source factory (step 1018). If it is not an extensible input source factory, a default input source factory is obtained from the translation environment object (step 1020) and the JSP input source is identified using this default input source factory (step 1022).

If an extensible source factory is provided, the JSP input source is obtained from the extensible input source factory (step 1024). Once the JSP input source is obtained from either the default or the extensible JSP input source, the translation process for translating the input source data into a servlet Java code file is started (step 1026). As part of this operation, a determination is made as to whether an extensible resources factory has been defined for the JSP (step 1028). If not, a default resources factory is obtained from the translation environment object (step 1030) and the resource object is obtained from the default resources factory (step 1032).

If an extensible resources factory is defined for the JSP, then the factory object is obtained from the extensible resources factory (step 1034). Based on the criteria set by the extensible resources factory object, or alternatively by the default resources factory object, i.e. timestamp, the JSP resources are checked (step 1036) and a determination is made as to whether the JSP resources are outdated (step 1038). If not, then the existing JSP servlet object may be used to process the JSP request (step 1040). If translation and generation of a new JSP servlet source file is necessary, then the translation and generation may be initiated using the resources factory object (step 1042).

As part of the generation of the JSP servlet object a determination may be made as to whether an extensible compiler factory is defined for the JSP (step 1044). If not, the default compiler factory is used to compile the JSP servlet source file into a JSP servlet object (step 1046). If an extensible compiler factory is defined, the compiler referenced by the extensible compiler factory is obtained (step 1048) and used to compile the JSP servlet source file into a JSP servlet object (step 1050). Thereafter, the generated JSP servlet object is used to process the JSP request and provide output to the originator of the JSP request.

A determination may be made as to whether processing of JSP requests is to be continued (step 1052). If so, the operation returns to step 1005. Otherwise, the operation terminates.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for processing a request directed to a Java Server Page (JSP) using a JSP engine, comprising:

receiving the request for the JSP by an extensible JSP resource manager system programming interface, wherein the extensible JSP resource manager system programming interface is programmed default behavior of the JSP engine for creating and loading JSP resources to be overridden without modifying the JSP engine, wherein the extensible JSP resource manager system programming interface includes a JSP translation context manager, a JSP input source manager, a created JSP resource manager, and a JAVA compiler manager;

determining by the JSP translation context manager if an extensible translation context has been defined for the JSP to which the request is directed, wherein the extensible translation context defines one or more alternative mechanisms for generating a JSP servlet from JSP input source data than is provided by the JSP engine;

generating a first JSP servlet based on the extensible translation context if an extensible translation context has been defined for the JSP;

generating a second JSP servlet based on a default translation context if an extensible translation context has not been defined for the JSP; and processing the request using one of the first JSP servlet and the second JSP servlet.

2. A computer program product in a computer recordable-type medium for processing a request directed to a Java Server Page (JSP) using a JSP engine, comprising:

first instructions for receiving the request for the JSP by an extensible JSP resource manager system programming interface, wherein the extensible JSP resource manager system programming interface is programmed for default behavior of the JSP engine for creating and loading JSP resources to be overridden without modifying the JSP engine, wherein the extensible JSP resource manager system programming interface includes a JSP translation context manager, a JSP input source manager, a created JSP resource manager, and a JAVA compiler manager;

second instructions for determining by the JSP translation context manager if an extensible translation context has been defined for the JSP to which the request is directed, wherein the extensible translation context defines one or more alternative mechanisms for generating a JSP servlet from JSP input source data than is provided by the JSP engine;

third instructions for generating a first JSP servlet based on the extensible translation context if an extensible translation context has been defined for the JSP;

fourth instructions for generating a second JSP servlet based on a default translation context if an extensible translation context has not been defined for the JSP; and fifth instructions for processing the request using one of the first JSP servlet and the second JSP servlet.

3. An apparatus for processing a request directed to a Java Server Page (JSP) using a JSP engine, comprising:

a memory;

a processor; and a network interface, wherein the processor receives the request via the network interface for the JSP by an extensible JSP resource manager system programming interface, wherein the extensible JSP resource manager system programming interface is programmed for default behavior of the JSP engine for creating and loading JSP resources to be overridden without modifying the JSP engine, wherein the extensible JSP resource manager system programming interface includes a JSP translation context manager, a JSP input source manager, a created JSP resource manager, and a JAVA compiler manager, determines by the JSP translation context manage if an extensible translation context has been defined for the JSP to which the request is directed, wherein the extensible translation context defines one or more alternative mechanisms for generating a JSP servlet from JSP input source data than is provided by the JSP engine, generates a first JSP servlet based on the extensible translation context if an extensible translation context has been defined for the JSP, generates a second JSP servlet based on a default translation context if an extensible translation context has not been defined for the JSP, and processes the request using one of the first JSP servlet and the second JSP servlet.

* * * * *